Aug. 23, 1932.  A. H. MEADE  1,873,616
ANIMAL TRAP
Filed Feb. 18, 1931    4 Sheets-Sheet 2
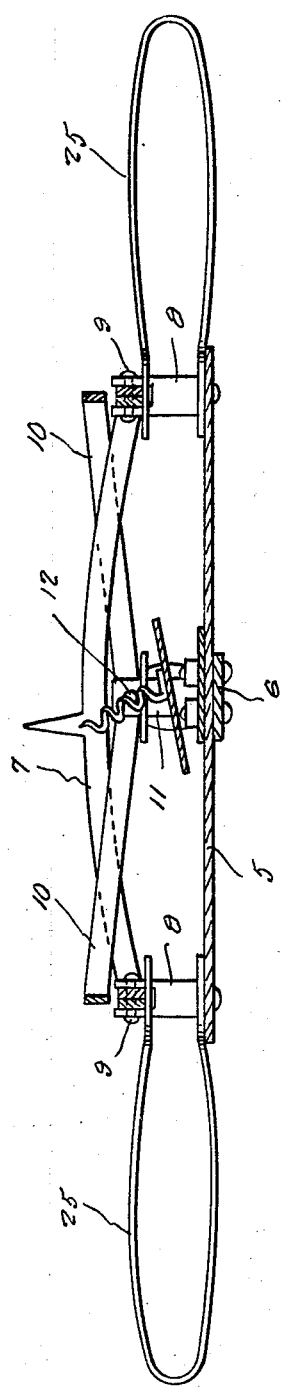
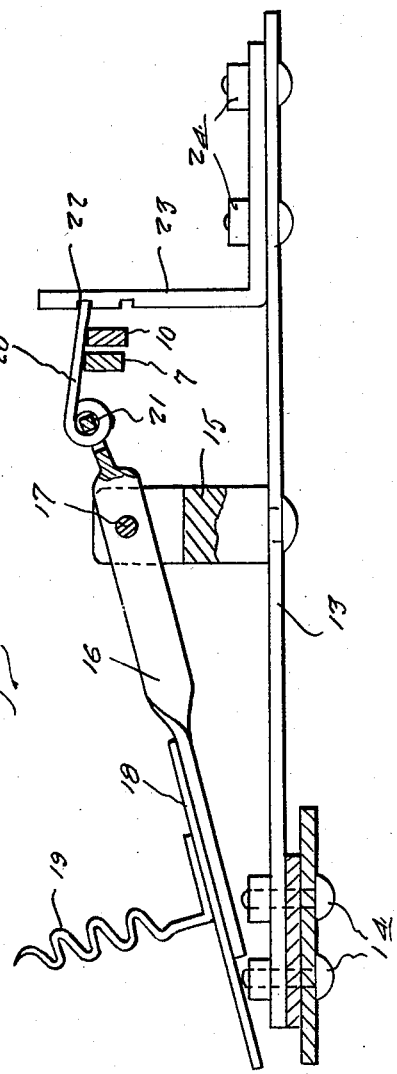
Inventor
A. H. Meade
By Clarence A. O'Brien
Attorney

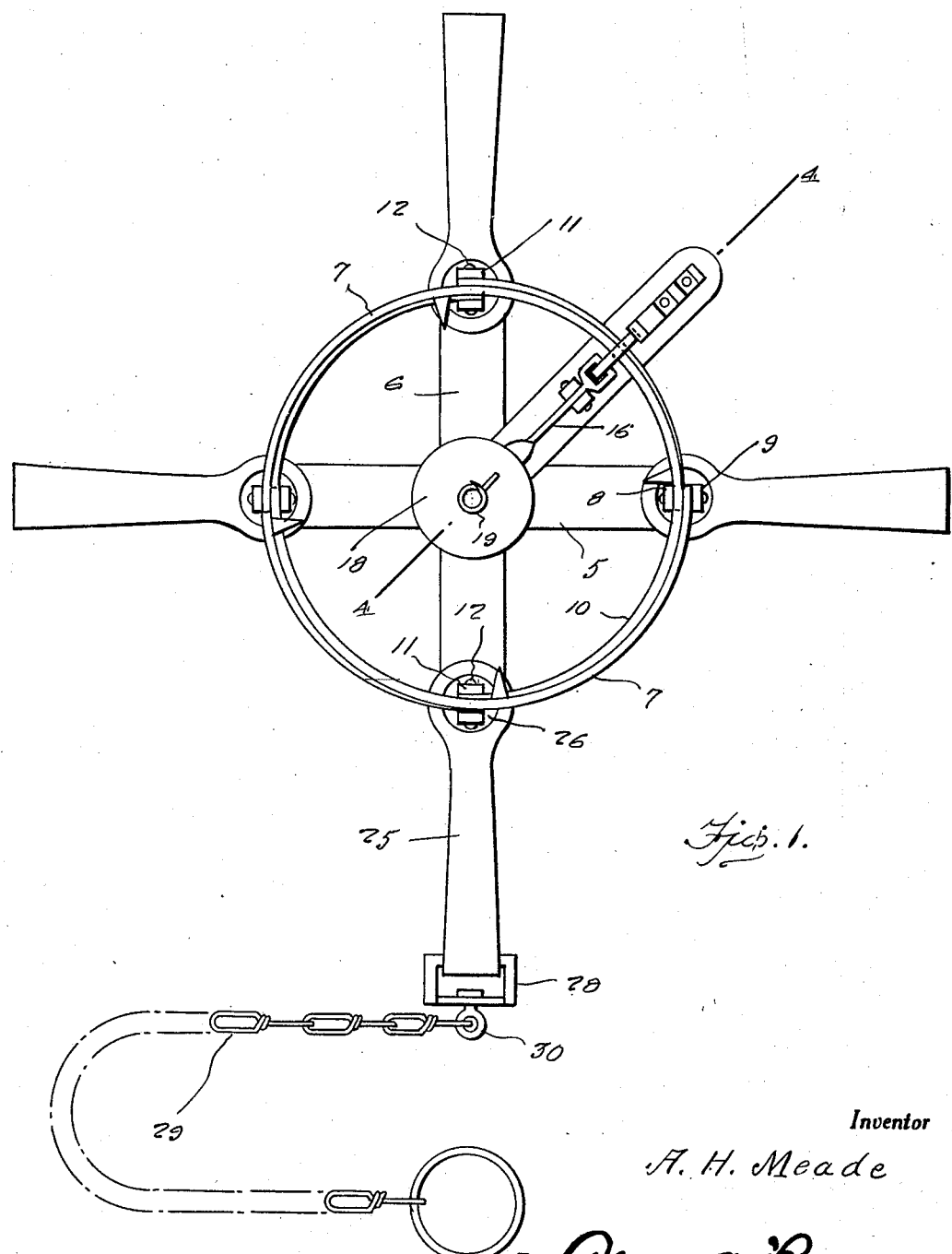

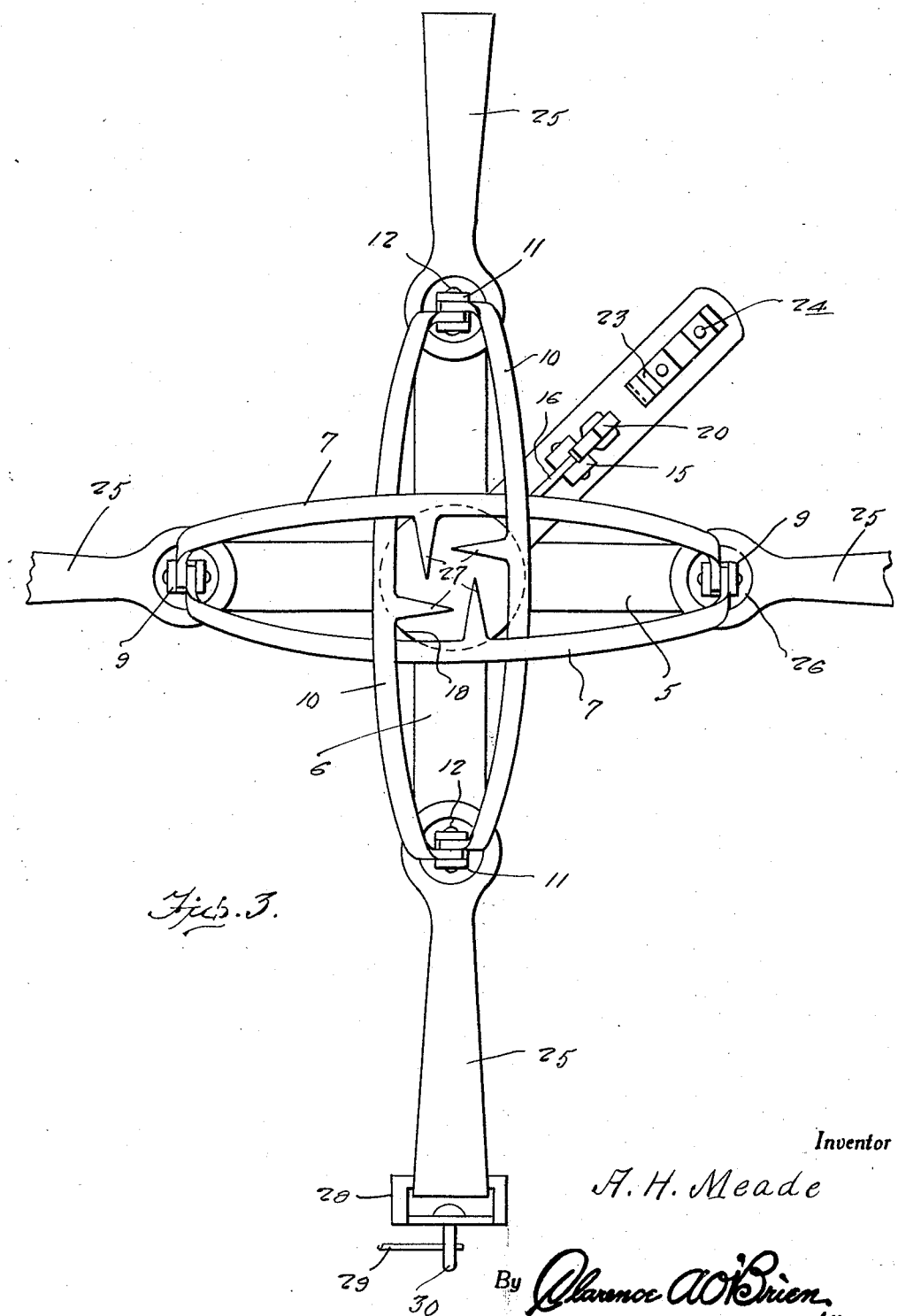

Aug. 23, 1932. A. H. MEADE 1,873,616
ANIMAL TRAP
Filed Feb. 18, 1931 4 Sheets-Sheet 4
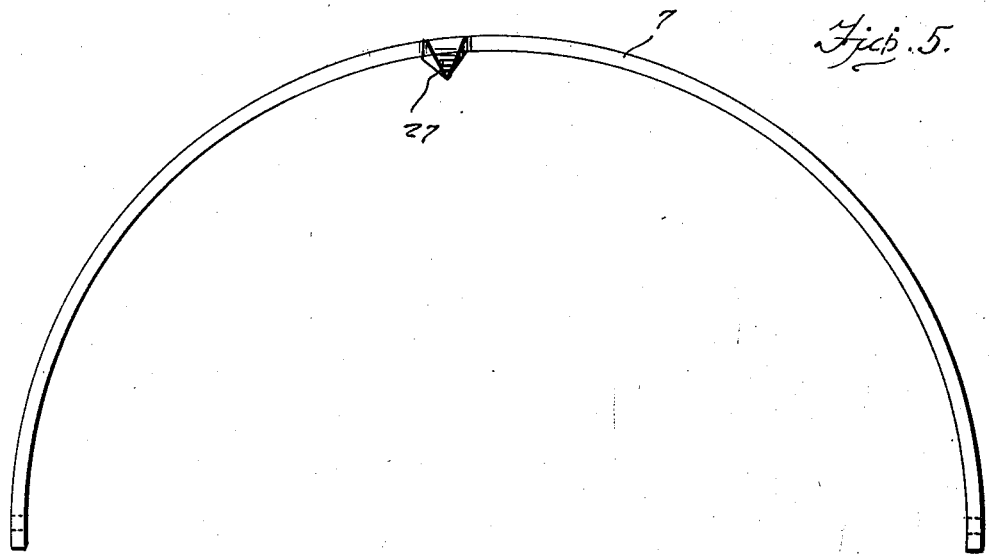
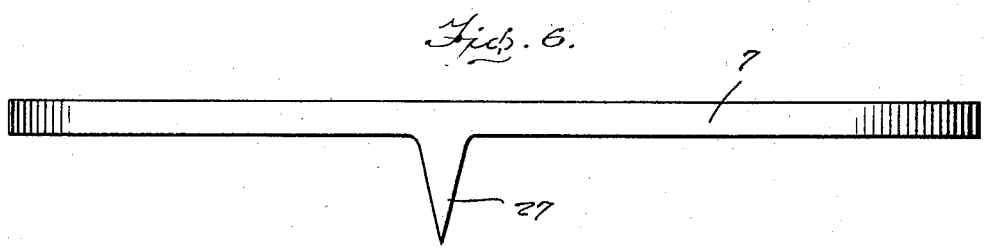
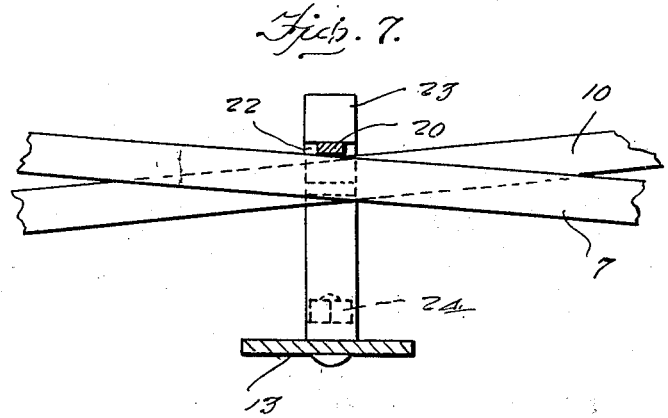
Inventor
A. H. Meade
By Clarence A. O'Brien
Attorney Patented Aug. 23, 1932

1,873,616

UNITED STATES PATENT OFFICE

ARCHIE H. MEADE, OF LAREDO, MONTANA

ANIMAL TRAP

Application filed February 18, 1931. Serial No. 516,717.

This invention relates to certain new and useful improvements in animal traps, and the primary object of the invention is to provide an animal trap which will positively engage the animal, when the trap is sprung, and further to provide such a trap which will so engage and entrap the animal as to provide against all possibility of the animal being able to gnaw the foot in an endeavor to escape, thus rendering the trap more humane than traps now in use for this purpose.

A still further object of the invention is to provide a trap which can be sprung only when the animal is so positioned as to insure a positive impaling of the animal, the base being so arranged and positioned as to render practical this particular purpose of the trap.

Other objects and advantages of the invention, and the invention itself will be best understood from a study of the following description, taken in connection with the accompanying drawings wherein:

Figure 1 is a plan view of the trap, the same being shown "set".

Figure 2 is a longitudinal sectional view therethrough.

Figure 3 is a plan view of the trap, the same being shown when "sprung".

Figure 4 is a fragmentary sectional elevational view taken substantially on the line 4—4 of Figure 1.

Figure 5 is a plan view of a jaw member.

Figure 6 is an elevational view thereof.

Figure 7 is a fragmentary sectional elevational view for more clearly illustrating the manner of retaining the trap in a set position.

With reference more in detail to the drawings, it will be seen that my improved trap comprises a base consisting of a pair of crossed bars 5 and 6 suitably secured together at their point of intersections to provide a somewhat cruciform base.

The trap further includes two pairs of jaws, the jaws of one pair being adapted to swing on an axis at substantially right angles to the jaws of the second pair. Each of the jaws is preferably semi-circular, and the jaws 7 of one pair at their corresponding ends are pivotally connected together and to posts 8 rising from the end of bar 5 as at 9.

The jaws 10 of the second pair at their corresponding ends are pivotally connected together and pivotally connected to posts 11 by pivot pins 12. Posts 11 extend upwardly from the bar 6.

Thus it will be seen that the jaws of one pair are adapted to swing on a pivot disposed at substantially right angles to the pivot of the jaws of the second pair and that the jaws of each pair are adapted to swing toward and away from one another.

As clearly suggested in Figures 2 and 3, the jaws 7 and 10 are so arranged, that one jaw of each pair passes between the jaws of a pair to the inner side of one jaw of the pair and the outer side of the second jaw of the pair with the result, that the jaws cooperate to retain the jaws in the position shown in Figures 1 and 2, that is in a "set" position so that the jaws form as it were a complete circle in the center of which is arranged the means for supporting the bait.

The jaws are releasably obtained in a "set" position or that position suggested in Figures 1 and 2 through the medium of suitable mechanism which includes a bar 13 secured at one end to the bars 5 and 6 at the point of intersection of the bars 5 and 6 through suitable fastening means 14. Bar 13 extends at an angle to the axis of the bars 5 and 6 and at its free end terminates beyond the corresponding ends of the bars 5 and 6. Rising from an intermediate portion of bar 13 is a post 15 and a lever 16 is pivoted adjacent one end to the upper end of the post as at 17. The free end of lever 16 which terminates substantially in the center of the ring formed by the jaws 7 and 10 is provided with a plate 18, and to the plate 18 is secured a centrally located bait impaling screw 19.

Adjacent its pivoted end, lever 16 is provided with an eye for engagement with the eye of a latch 20 as at 21. The catch member 20 is adapted to engage adjacent jaws 7 and 10 and the free end of the latch, for normally retaining the jaws in the position shown in Figure 1, is adapted to be engaged with a selected one of vertically spaced notches 22 provided on a vertical keeper bar 23. The keeper bar 23 at the lower end thereof is provided with a flange bolted or otherwise secured as at 24 to the bar 13 adjacent to the free end of the bar.

When the parts are in the position shown in Figures 1, 2 and 4, it will be apparent that the catch member 20 will be retained in engagement with selected notch 22 by reason of the weight on the free end of lever 16 provided at said end by the base impaled on the screw 19, thus releasably retaining jaws 7 and 10 in a set position against the action of a plurality of expansible normally contracted members 25.

There is one member 25 for each post 9 and 11, and each of the members 25 is formed from a single length of flexible metal bent into a substantial U, the ends of each member 25 being apertured as at 26 for accommodating its post 9 or 11 as the case may be.

When the jaws 7 are in their set position, or in the position shown in Figures 1 and 2, the said jaws will contact the ends of the members 25 normally urging the end of the respective members inwardly toward one another thus contracting and placing the members 25 under tension as suggested in Figure 2, with the result that upon displacement of the catch 20, the jaws 7 and 10 will be forced upwardly about their pivots to the position suggested in Figure 3 for entrapping therebetween the animal.

It will be noted that such an arrangement permits of the jaws 7 and 10, even when in a set position being contacted with by the animal without causing the trap to be sprung, it being apparent that the trap will be sprung only when the animal attempts to gnaw or remove the bait from the screw 19, the animal in so attempting to make away with the bait being required to exert an upward pull with the result that lever 16 will be swung about its pivot for releasing catch 20 thus springing the trap.

Each of the jaws 7, 10 is provided intermediate its ends with an impaling prong 27, and the prongs 27 are so arranged as not to interfere with one another, but to insure impaling of the animal thereon.

It will be seen that a trap of this character when sprung, will cause almost immediate death of the animal thus obviating subjecting the animal to any unnecessary and inhuman suffering.

Engaged with one of the members 25 is a substantially loop shaped member 28, and one end of an anchoring chain 29 is suitably engaged with the member 28 through the medium of an eye bolt 30.

Even though I have herein shown and described the preferred embodiment of the invention, it is to be understood that the same is susceptible to changes, modifications and improvements coming within the scope of the appended claims.

Having thus described my invention, what I claim as new is:

1. An animal trap comprising a base, two pairs of cooperating jaws, the jaws of each pair being connected together at their opposite ends, and the jaws of one pair being disposed at right angles to the jaws of the other pair and intertwining therewith when the jaws of the respective pairs are swung away from one another to set the trap, a lever pivotally mounted adjacent one end thereof on said base within the confines of said jaws, a bait impaling member mounted on the free end of said lever, a catch bar mounted on said base, and a catch member engaged at one end with the pivoted end of said lever, and at its other end engageable with said catch bar, with the intermediate portion of said catch member engageable with certain of said jaws for retaining the jaws in their last mentioned set position.

2. An animal trap comprising a base, two pairs of cooperating jaws, the jaws of each pair being connected together at their opposite ends, and the jaws of one pair being disposed at right angles to the jaws of the other pair and intertwining therewith, and engageable with the jaws of said other pair for cooperation therewith when the jaws of the respective pairs are swung away from one another to set the trap, a lever pivotally mounted adjacent one end thereof on said base within the confines of said jaws, a bait impaling member mounted on the free end of said lever, a catch bar mounted on said base, and a catch member engaged at one end with the pivoted end of said lever, and at its other end engageable with said catch bar, with the intermediate portion of said catch member engageable with certain of said jaws for retaining the jaws in their last mentioned set position, and means engageable with the jaws of each pair for normally urging the jaws of the respective pairs toward one another.

In testimony whereof, I affix my signature.

ARCHIE H. MEADE.